United States Patent Office 3,666,344
Patented May 30, 1972

3,666,344
TIME-AVERAGE HOLOGRAPHY WITH A MODULATED REFERENCE BEAM
Francois Mottier, Zurich, Switzerland, assignor to Aktiengesellschaft Brown, Boveri & Cie, Baden, Switzerland
Filed Aug. 4, 1970, Ser. No. 60,800
Claims priority, application Switzerland, Aug. 27, 1969, 12,972/69
Int. Cl. G01n 21/46; G02b 27/00
U.S. Cl. 350—3.5                     6 Claims

ABSTRACT OF THE DISCLOSURE

A method is provided for holographic analysis of a vibrating object which comprises the steps of producing from one and the same monochromatic coherent light source an illuminating beam which illuminates the object and a reference beam which interferes on a holographic plate with object-light scattered by the object. The reference beam is phase-modulated with a modulation function which differs from the object vibration function for the purpose of reducing large differences in intensity as between the nodal-lines and the iso-amplitude lines appearing in the reconstructed hologram, and for providing information as to the phase relationship between vibrating points of the object. The modulation function of the reference beam can be triangular when the object vibration function is sinusoidal, and both functions have the same period and can either be in phase or phase shifted.

---

This invention relates to an improved method for holographic analysis of vibrating objects wherein one and the same monochromatic coherent light source produces a first illuminating beam which illuminates the object, and also a second reference beam which interferes on a hologram plate with object-light scattered by the object, the reference light beam being phase-modulated.

It is known that even slight movements of an object while a holograph is being recorded upset the interference pattern produced on the hologram plate by the object. However, if the amplitudes of object-movement are sufficiently small, the disturbances in the interference pattern may be analyzed, and information regarding object-movement may be obtained. In this connection, reference is made to the article by Powell and Stetson, J. Opt. Soc. Am. 55, 1593 (1965).

For example, when a reconstruction is taken from a hologram of a vibrating object, those parts at which the vibrating object being moved is at rest, that is to say (vibration nodes) the nodal-lines appear bright, while parts of the object undergoing movement appear less bright. In addition, parts vibrating with equal amplitudes (iso-amplitude lines) also appear bright in the picture reconstructed from the hologram, resulting more particularly in the possibility of recognizing those points at which the object is undergoing maximum deformation. Consecutive iso-amplitude lines characterize amplitudes having a difference in magnitude of about $\lambda/2$ when $\lambda$ is the wavelength of the reference light.

Holography is therefore especially suitable for vibrational analysis of matter, as well as in the construction of machines, loudspeakers or musical instruments, or even of bridges or aircraft. Its particular advantage resides in that measurement is carried out without contact, the whole surface of the object under test is taken in simultaneously, and there is no need for any mechanical or electronic sensing means.

However, the known method—according to the referenced article by Powell and Stetson still involves disadvantages in material analysis to the extent that it does not enable any conclusions to be drawn from the holograms reconstruction regarding the phase at which points of the object vibrate, and the iso-amplitude lines are very difficult to be seen as compared with the nodal-lines, since the intensities of the nodal-lines and of the iso-amplitude lines adjoining them are proportional to the square of the maxima of the zero-order Bessel function, so that the nodal-line appears with great intensity, while the iso-amplitude lines following it appear with ever-weakening intensity.

The object of the present invention is to provide an improved method of object analysis by means of which large differences in intensity between the nodal-lines and the iso-amplitude lines appearing in the reconstructed hologram are reduced. The improved method also provides information regarding the phase relationship between vibrating points of the object.

In accordance with the invention, the improved holographic analysis method results from the fact that the modulation function is different from the object-vibration function. Thus, in particular, a non-sinusoidal function is utilized as the modulation function in the case of a sinusoidally vibrating object.

Advantageous developments of the invention reside in that the modulation function and object-vibration are at the same frequency, or have the same cycle-duration, respectively. More particularly, the fundamental frequency of the modulation function is equal to the fundamental frequency of the vibrating object, and/or, that the modulation function is triangular.

This enables the intensity i.e. brightness of the nodal-line to be reduced, and the intensities of the iso-amplitude lines adjoining them to be increased.

Information regarding the phase-relationships of the vibrating points of the object is obtained by observing the phase-shift between the modulation function and object-vibration. If the phase-shift between the modulation function and object-vibration is essentially equal to $\pi/2$ radians the intensities of the iso-amplitude lines are distributed symmetrically with respect to the nodal-line, and no information regarding phase-relationships of the vibrating points of the object is thus obtained.

However, if the phase-shift is equal to zero, or multiples of $\pi$, or asymmetries in intensity-distribution appear on both sides of the nodal-line, so that points on the object vibrating in different phases may be distinguished.

Various known devices may be used for phase-modulating the reference light; for example, mechanical modulators such for example as moving mirrors linked to piezo-electric oscillators, or electrically controllable light-delay elements such example as a Pockels cell, or even magnetic delay elements.

The advantageous manner in which the method according to the invention operates will become more understandable from the following considerations.

If the hologram is illuminated for the purpose of reconstructing the object-field with a wave field corresponding to the reference light used when recording, the wave proceeding from a reconstructed object-point has an intensity I, which is determined by the following equation:

$$I \sim \left\{ \frac{1}{T} \int_0^T \cos\left[\varphi_1(t) - \varphi_2(t)\right] dt \right\}^2$$

wherein T is the exposure time, and $\varphi_1$ and $\varphi_2$ are the phase-functions of the object-wave and of the reference-wave in dependence upon time $t$.

If the object-point is vibrating harmonically with the angular frequency $\omega$, the phase function of the object-wave is $z \cdot \sin \omega t$ where $z = 4\pi kb/\lambda$, $k$ is a dimensionless geometrical factor, $b$ is the amplitude of the object-vibration, and $\lambda$ is the wavelength of the light. $b$ is expressed in multiples of the light wavelength $\lambda$.

Now if the reference wave is stationary, i.e. not modulated, $\omega_2(t) = \text{cons} = 0$ and it follows that $$I \sim J_0^2(z)$$

i.e. the intensity, or brightness, of the wave proceeding from a reconstructed object-point when the hologram is illuminated is proportional to the square of the zero-order Bessel function with the argument $z = 4\pi k b/\lambda$. This results in the disadvantageous conditions set forth in the introduction, which are to be eliminated in accordance with the invention.

However, if the reference light is now phase-modulated in step with the object-vibration with a function differing from the latter, for example with a triangular function having an amplitude $a/2$, wherein $a$ is the phase-stroke expressed in degrees of angle, and having the phase constant $\delta$ with respect to the sinusoidal vibration of the object, then:

$$I \sim \left[ 1/\pi \int_0^\pi \cos\left( z \sin(\omega t + \delta) + a(\omega t - \pi/2) \right) d\omega t \right]^2$$

This equation may be expressed by cylindrical functions for certain values of $a$ and $\delta$, for example for vanishing $\delta$ by Anger and Weber-Lommel functions. For $a=0$, it follows that $I \sim J_0^2(z)$, as stated above.

Further advantages and features of the invention will become more apparent from the following detailed description of a preferred embodiment thereof and from the accompanying drawings which illustrate it and wherein.

Figure 1:
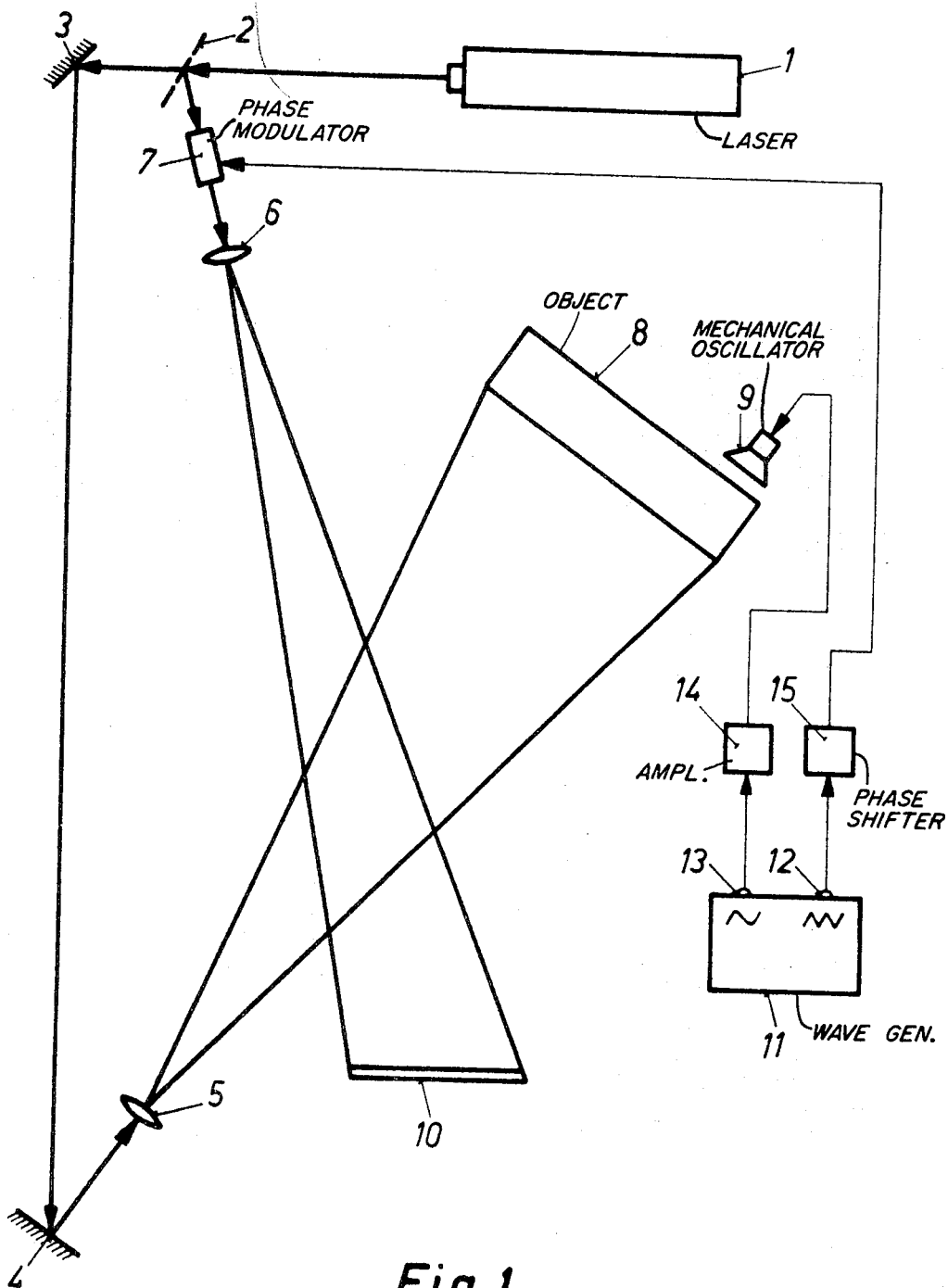
FIG. 1 is a diagrammatic illustration of the arrangement for carrying out the analysis method according to the invention.

With reference now to the drawings, and to FIG. 1 in particular, a laser 1 produces a monochromatic, coherent and precisely defined parallel light-beam. This light-beam is split up by a beam splitter, for example a semi-transparent mirror 2, into an illuminating beam proceeding to the deflector mirrors 3, 4 and a reference beam proceeding to a phase-modulator 7.

Microscope-objectives 5, 6 widen the beams, so that they illuminate the object 8 and hologram plate 10, respectively. In addition to being illuminated by the widened reference light, the hologram plate is also illuminated by object-light, not illustrated, scattered by the object 8.

A tone-generator 11 is provided which has two outputs. One output 12 delivers a triangular waveform composed entirely of linear segments and the other output 13 delivers a sinusodal waveform.

The sinusoidal oscillation at output 13 amplified via an amplifier 14 excites a mechanical oscillator 9 which is coupled to the object 8 and imparts mechanical oscillations to it.

The phase-modulator 7 is operated by means of the triangular oscillations from output 12 so that the hologram plate 10 is illuminated by a reference light phase-modulated by the triangular oscillation of output 12. A phase-shifter 15 in the circuit leading to phase-modulator 7 produces the phase constant $\delta$.

Figure 2:
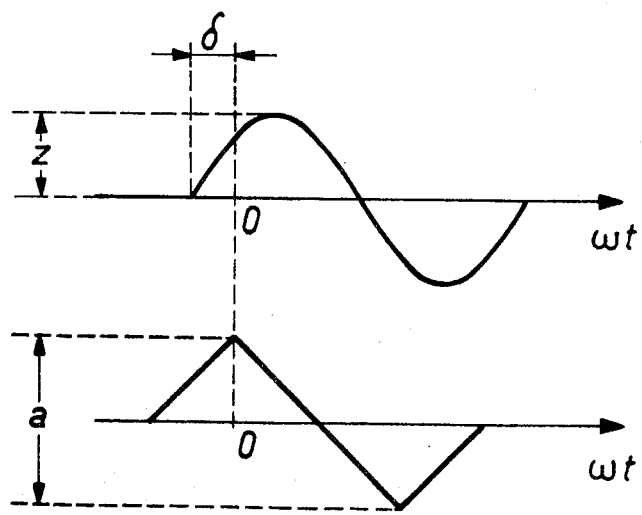
FIG. 2 are curve plots which illustrate an object-vibration function and a modulation function for the reference light.

The upper curve of FIG. 2, plotted against time $t$ illustrates the sinusoidal oscillation with which a point of the object being holographed moves, and the lower curve illustrates the triangular function with which the reference light is phase-modulated. The triangular function has an amplitude $a/2$, $a$ being the same factor as set out above.

The phase-constant between the two functions amounts to $\delta$. For positive values of $z$ the object-vibration and modulation function are in phase when $\delta = \pi/2$.

Figure 3:
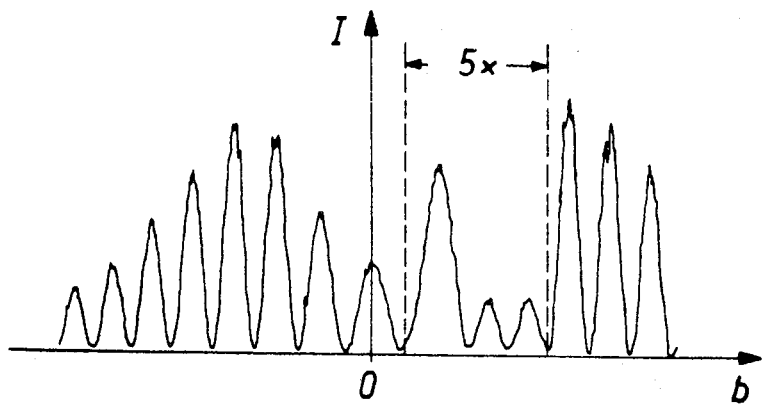
FIG. 3 illustrates the hologram gauged by photometry with a photomultiplier, of a rod vibrating with a sinusoidal function illustrated in FIG. 2.

FIG. 3 illustrates the hologram, gauged by photometry with a photomultiplier, of the object vibrating with the sinusoidal function illustrated in FIG. 2, when the reference light is phase-modulated by the triangular oscillation like-wise illustrated in FIG. 2, where $\delta = \pi/2$. The intensity I is plotted on the ordinate, and the amplitude of oscillation $b$ on the abscissa. The scale for I is reduced, as given in the region indicated by the arrow. It is clearly to be seen how the maximum intensity corresponding to the nodal-line (abscissa-point 0) is reduced.

It is further clearly evident from FIG. 3 that the distribution of maximum intensities differs widely for the iso-amplitude lines to the left and right of the nodal-line. This arises from the fact that object-points on one side of the nodal-line vibrate in opposite phase to object-points on the other side thereof. If the phase-constant $\delta$ between object-vibration and modulation-oscillation amounts to $\pi/2$, and object-vibration and modulation-oscillation are thus in phase, the distribution of maximum intensities is asymmetrical with respect to the maximum of the nodal-line. The more the phase-constant $\delta$ departs from odd multiples of $\pi/2$, i.e. the less the phase-shift equals zero or multiples of $\pi$, the less pronounced is the asymmetry in the distribution of maximum intensities.

I claim:

1. In a method of holographic analysis of a sinusoidally vibrating object in which a time-average hologram of said sinusoidally vibrating object is constructed by producing from a single monochromatic coherent light source an illuminating beam which illuminates the object and a reference beam which is directed to interfere on a holographic recording medium with object light scattered by said object, the improvement which comprises the step of phase modulating said reference beam with a modulation function having the same period as the object vibration and having a triangular wave form composed entirely of linear segments.

2. The method as defined in claim 1 for holographic analysis wherein said triangular wave form modulation function for said reference beam is in phase with the object vibration.

3. The method as defined in claim 1 for holographic analysis wherein said triangular wave form modulation function for said reference beam is shifted in phase with respect to the object vibration.

4. The method as defined in claim 1 for holographic analysis wherein said triangular wave form modulation function for said reference beam has a phase shift of a whole multiple of $\pi$ radians relative to the object vibration.

5. The method as defined in claim 4 for holographic analysis wherein the phase shift between said modulation function for said reference beam and the object vibration amounts to a fraction of $\pi$ radians.

6. The method as defined in claim 4 for holographic analysis wherein the phase shift between said modulation function for said reference beam and the object vibration amounts to $\pi/2$ radians.

References Cited

Aleksoff, Applied Physics Letters, vol. 14, No. 1, January 1969, pp. 23–24.

DAVID SCHONBERG, Primary Examiner

R. J. STERN, Assistant Examiner

U.S. Cl. X.R.

73—67.5 H; 356—106

UNITED STATES PATENT OFFICE
CERTIFICATE OF CORRECTION

Patent No. 3,666,344      Dated May 30, 1972

Inventor(s) Francois Mottier

It is certified that error appears in the above-identified patent and that said Letters Patent are hereby corrected as shown below:

In the Specification:

Column 2 - line 44 - the word "or" should be cancelled.

In Claims 4, 5, and 6, line 1 of each claim, should read -- 3 --

Signed and sealed this 5th day of December 1972.

(SEAL)
Attest:

EDWARD M. FLETCHER, JR.
Attesting Officer

ROBERT GOTTSCHALK
Commissioner of Patents